United States Patent [19]
Lanan et al.

[11] Patent Number: 5,907,128
[45] Date of Patent: May 25, 1999

[54] CABLE CONNECTOR WITH FLUID INJECTION PORT

[75] Inventors: Keith Lanan, Renton; Albert W. Chau, Woodinville; William R. Stagi, Seattle, all of Wash.

[73] Assignee: Utilx Corporation, Kent, Wash.

[21] Appl. No.: 08/799,547

[22] Filed: Feb. 13, 1997

[51] Int. Cl.⁶ .................................................. H02G 15/02
[52] U.S. Cl. ........................ 174/74 R; 174/76; 174/84 R
[58] Field of Search ............................... 174/74 R, 74 A, 174/76, 84 R, 84 C, 21 R, 21 JS

[56] References Cited

U.S. PATENT DOCUMENTS

| | | |
|---|---|---|
| 2,938,940 | 5/1960 | Calendine et al. . |
| 2,958,844 | 11/1960 | Smith et al. . |
| 3,036,147 | 5/1962 | Wheaton et al. ...................... 174/84 C |
| 3,242,255 | 3/1966 | Falkenstein et al. . |
| 3,810,078 | 5/1974 | Chordas ............................ 174/84 C X |
| 3,846,578 | 11/1974 | Bahder et al. ......................... 174/76 X |
| 4,144,404 | 3/1979 | De Groef et al. ................. 174/84 R X |
| 4,477,376 | 10/1984 | Gold ...................................... 174/76 X |
| 4,484,022 | 11/1984 | Eilentropp . |
| 5,132,495 | 7/1992 | Ewing et al. ...................... 174/84 C X |
| 5,245,133 | 9/1993 | DeCarlo et al. ....................... 174/76 X |

FOREIGN PATENT DOCUMENTS

| | | | |
|---|---|---|---|
| 3149 048 | 6/1983 | Germany .............................. 174/84 C |
| 870165 | 6/1961 | United Kingdom ................. 174/84 R |

Primary Examiner—Kristine Kincaid
Assistant Examiner—Chan N. Nguyen
Attorney, Agent, or Firm—Christensen O'Connor Johnson & Kindness PLLC

[57] ABSTRACT

A device for repairing and electrically connecting at least two sections of electrical cable includes an elongate connector, for example a tube, having two open ends that are each adapted to receive an end of an electrical cable section. The cable connector has an interior wall longitudinally dividing the cable connector into two portions, each portion having a hollow interior for containing the end of one of the two electrical cable sections. The cable connector also has an orifice in each of the two portions communicating with the hollow interior of that portion. A closure device, such as a threaded plug, is mateable with each orifice. In operation, water damage to the electrical cable portions is repaired by securing an end of an electrical cable section in the hollow interior of each of the two portions of the cable connector and passing water-damage repairing chemicals through the orifices in the cable connector, into the hollow interior of each of the two portions of the cable connector, and into the interior of the sections of the electrical cable. The secondary addition of damming chemicals through the cable connector and into the electrical cable sections is not required. The sections of electrical cable are electrically connected when secured in the hollow interior of the two portions of the cable connector; therefore, the cable connector also functions as a splice electrically joining the two wire sections. With the connection of only a single cable end to the conduit for passage of water damage repair chemicals therethrough, the conduit functions as a terminal.

14 Claims, 8 Drawing Sheets

CABLE CONNECTOR WITH FLUID INJECTION PORT

FIELD OF THE INVENTION

The invention relates to electrical cable connectors, such as splices; and further relates to conduits, or the like, for injection of fluid into the interior of electrical cables.

BACKGROUND OF THE INVENTION

Beginning in the post-war construction boom of the late 1950s and early 1960s, overhead electrical cable lines were recognized as an eyesore. Underground electrical cable technology was developed and implemented due to its aesthetic advantages and reliability. Underground electrical cable, a medium voltage cable that carries from 5,000 volts to 35,000 volts with an average voltage of 15,000 volts, initially employed high molecular weight polyethylene (HMWPE) polymer as the insulation of choice due to its low cost and ease of manufacturing. Subsequently, cross-linked polyethylene (XLPE) and ethylene propylene rubber (EPR) replaced high molecular weight polyethylene as the insulation. More recently, a water damage retardant formulation has also been included in these newer types of insulation.

Underground electrical cable was initially touted as having a useful life of from 25 to 40 years. However, the useful life of underground cable has rarely exceeded 20 years, and has occasionally been as short as 10 to 12 years. Catastrophic failure of older HMWPE, XLPE, and EPR cable is now beginning to occur due to water damage known as "water trees." Water trees are formed in the polymer when medium to high voltage alternating current is applied to a polymeric dielectric (insulator) in the presence of liquid water and ions. As water trees grow, they compromise the dielectric properties of the polymer until the insulation fails. Many large water trees initiate at the site of an imperfection or contaminant, but contamination is not a necessary condition for water trees to propagate.

Water tree growth can be eliminated or retarded by removing or minimizing the water or ions, or by reducing the voltage stress. Voltage stress can be minimized by employing thicker insulation. "Clean room" manufacturing processes can be used to both eliminate ion sources and minimize defects or contaminants that function as water tree growth sites. Another approach is to change the character of the dielectric, either through adding water tree retardant chemicals to polyethylene or by using more expensive, but water tree resistant, plastics or rubbers. All of these approaches have merit, but only address the performance of electrical cable yet to be installed.

For electrical cables already underground, the options are more limited. First, the entire failing electrical cable can be replaced, but the cost is often prohibitive. Second, the points of failures due to water tree propagation can be excised and the removed portions replaced with a splice. Unfortunately, since water trees are not identifiable until after cable failure occurs, splicing after cable failure results in a power interruption to the electric utility customers. Third, the cable can be dried with a desiccant fluid such as nitrogen in order to remove the water that initiates the water tree. While this approach improves the dielectric properties of the underground cable, it requires perpetual maintenance to replace large and unsightly nitrogen bottles that remain coupled to the cable.

A more promising approach to retard failure of underground cable is to inject a silicone fluid such as, for example, CABLECURE®, into the electrical cable conductor strands. CABLECURE reacts with water in the underground cable and polymerizes to form a water tree retardant that is more advanced than those used in the manufacture of modern cables. The dielectric properties of the cable are not only stabilized by CABLECURE, but actually improved dramatically.

However, the devices and methods used to treat underground electrical cables with CABLECURE do have drawbacks. Different methodologies are employed depending upon the type of cable being treated. There are two main classes of cables, underground residential distribution (URD) cables which are relatively small cables, and feeder cables, which are larger cables which often supply the URD cables.

Regarding the treatment of feeder cables with CABLECURE, a major problem is the ability of splices which are often encountered in the feeder cable to hold the pressure required to inject perhaps miles of the feeder cable with CABLECURE. The larger the overall cable diameter, the larger the splice, and the higher the hoop forces created by the pressurization of the cable cavity. Due to the large diameter of feeder cables, there is seldom sufficient hoop strength in the typical splices to withstand the basic vapor pressure of the CABLECURE without leaking, not to mention the increased pressurization required to transport the CABLECURE along the miles of feeder cable. A leak of CABLECURE in the splice can create a contaminated path along the splice interface which may lead to eventual failure of the splice.

To avoid the problem of CABLECURE leaking at splices, one of two approaches have been employed for injection of CABLECURE into feeder cables. First, the splice can be reinforced with clamps or other devices to increase its hoop strength. However, this approach is limited because the force necessarily applied by the hose clamps or other reinforcement devices on the splice is so large that there is substantial deformation of the rubber material used to make the splice. The deformation compromises the geometrical and electrical integrity of the splice and thus provides only a slight increase in injection pressure tolerance. A second approach is to remove the splice prior to injecting the two separated segments of the electrical cable with CABLECURE, then injecting CABLECURE, and finally injecting a second damming chemical compound into the two electrical cable segments that physically blocks the migration of the CABLECURE into a new splice that is applied to the two cable segments after the CABLECURE treatment has been completed. An example of a damming compound is a combination of dimethylsilicone polymers with vinyl cross-linker and a suitable catalyst. In addition to low viscosity and quick cure times, a damming fluid must be compatible with all cables, splices and other components. Drawbacks with the above method of employing a damming compound include the additional cost of the expensive damming compound, the necessity to install a new splice, and the possibility that the CABLECURE may compromise the structural integrity of the new splice if the physical partition formed by the damming compound fails.

Further, it has been learned that injection of damming compounds into even short lengths near the end of a cable can create transient discontinuities in the penetration of the dielectric enhancement fluid. These discontinuities of penetration create discontinuous treatment, which at a minimum leaves some small section of the cable untreated for a longer period of time, increasing the risk of a post treatment dielectric failure. Further, there is a potential that these discontinuities can even lead to local electrical stress increases which may contribute to a failure in the region where the dam interferes with uniform penetration. Since the point of injecting cable is to increase its reliability and mitigate its proclivity to fail, the use of either reinforcing devices or damming compounds to handle sufficient injection, vapor and elevation-induced pressure are not ideal solutions.

CABLECURE injection can also be employed to treat water tree damage in URD cables. Since the diameter of the URD cables is less than that of feeder cables, the splices in URD cables can withstand the vapor pressure of CABLECURE. Additionally, due to the typically shorter lengths of the URD cables, a lower pressure (0–30 psig) than the pressure employed in feeder cables is required to transport the CABLECURE through the URD cable; therefore, the splices in the URD cable are not subjected to the moderate pressures (30–120 psig) desired to inject typically longer feeder cable and their integral splices. However, because an URD cable does not have enough interstitial volume in the strands of the cable to hold sufficient CABLECURE for maximum dielectric performance, URD cables require an extended soak period of 60 days or more to allow for additional CABLECURE to diffuse from the cable strands into the polyethylene. When very long URD cables or URD cables with large elevation changes are encountered, moderate to medium (120–350 psig) pressure injection of CABLECURE may be required. The moderate to medium pressure addition of CABLECURE to an URD cable therefore necessitates removing the splices during the treatment of the cable, followed by adding new splices after the treatment.

A need thus exists for devices and methods whereby expensive damming compounds are not required to block the contact of repair chemicals with the replacement splice in feeder cables.

A need also exists for devices and methods in which both a separate conduit for injecting CABLECURE into a feeder cable as well as a separate replacement splice are not required.

A further need exists for devices and methods in which repair chemicals can be injected into URD cables at moderate to medium pressures without compromising the structural integrity of splices.

SUMMARY OF THE INVENTION

A device and method for repairing and electrically connecting, in a first embodiment, at least two sections of electrical cable includes an elongate conduit, for example, a tube having two open ends that are each adapted to receive an end of an electrical cable section. The elongate conduit has an interior wall longitudinally dividing the elongate conduit into two portions, each portion having a hollow interior for containing the end of one of the two electrical cable sections. The elongate conduit also has an orifice in each of the two portions communicating with the hollow interior of that portion. A closure device, such as a threaded plug, is mateable with each orifice. Additionally, the device further comprises a fluid-tight seal over the juncture of each electrical cable section end and at each end of the elongate conduit. In operation, water damage to the electrical cable portions is repaired by securing an end of an electrical cable section in the hollow interior of each of the two portions of the elongate conduit, sealing those junctures, and passing repairing chemicals through the orifices in the elongate conduit, into the hollow interior of each of the two portions of the elongate conduit, and into the interior of the sections of the electrical cable. The secondary addition of damming chemicals through the elongate conduit and into the electrical cable sections is not required. The sections of electrical cable are electrically connected when secured in the hollow interior of the two portions of the elongate conduit; therefore, the elongate conduit also functions as a splice electrically joining the two wire sections.

Preferably, the elongate conduit further comprises an annular groove adjacent each elongate conduit end, on the hollow interior and intersecting the orifice to augment fluid flow. The elongate conduit also preferably comprises an annular groove adjacent each elongate conduit end and around the elongate conduit exterior for strain relief. Most preferably, the elongate conduit also comprises an annular groove adjacent each elongate conduit end and around the elongate conduit exterior that is sized to receive an interior seal locatable between the elongate conduit and the fluid-tight sheath.

In another embodiment of the present invention, an end of a single electrical cable is secured to an end of an elongate conduit having a hollow interior that contains the electrical cable end. A single orifice communicates with the hollow interior for passage of chemicals therebetween. A single fluid-tight seal is located over the juncture of the single electrical cable end and end of the elongate conduit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
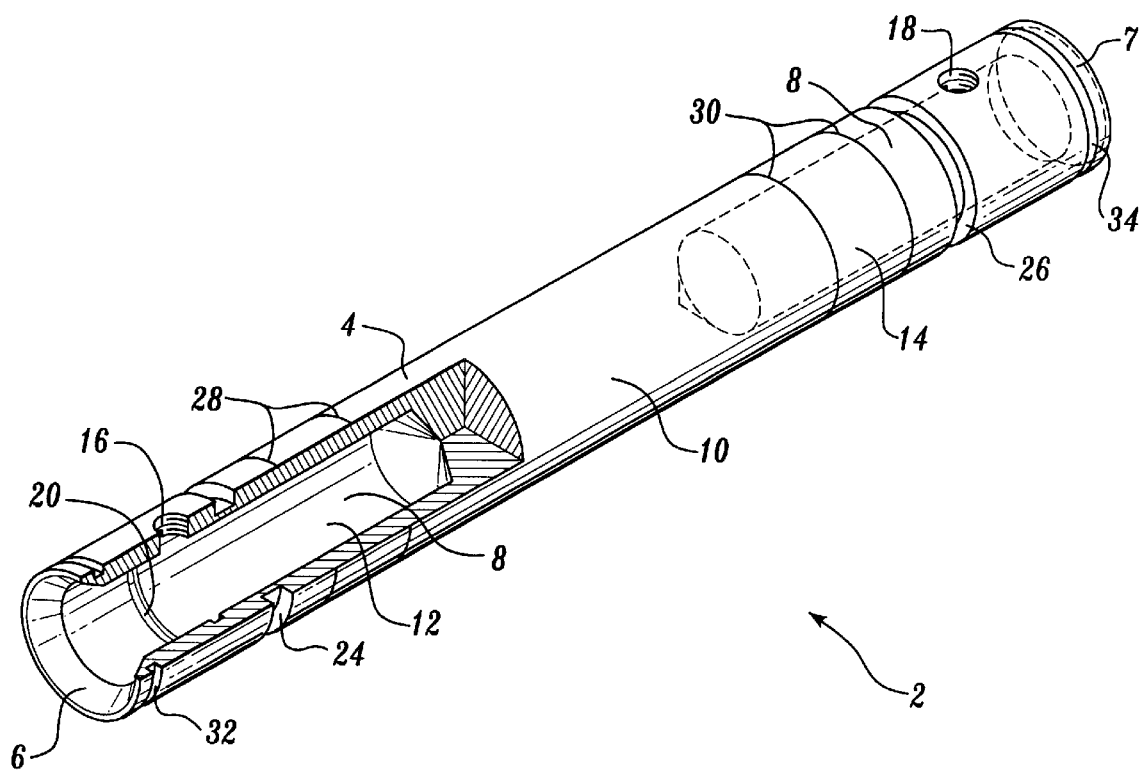
FIG. 1 is a perspective view, partially exposed, of a cable connector of the present invention.
Figure 2:
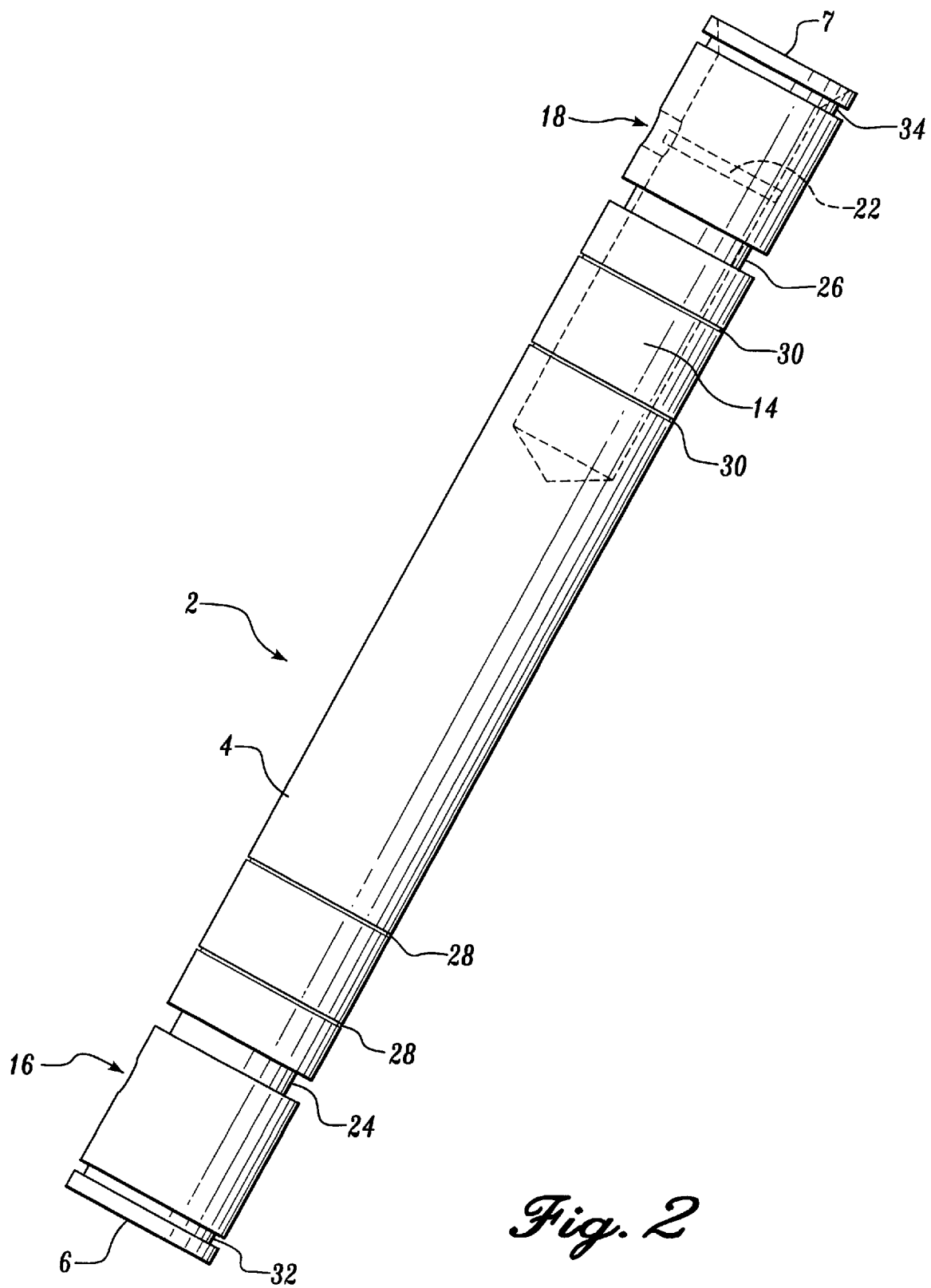
FIG. 2 is a side view of the cable connector of the present invention.

FIGS. 1 and 2 depict a cable connector 2 of the present invention in the form of an elongate conduit which may be, for example, a tube, pipe or any other similarly shaped device capable of fluid transport. The cable connector has an exterior 4, ends 6 and 7, and an interior 8 that is divided by an interior wall 10 into two hollow portions 12 and 14. The hollow portions 12 and 14 are each sized and shaped to receive an end of an electrical cable or cable section. A portion of a cable that has been stripped to remove the outer insulation from the cable is inserted into each hollow portion. The ends of the cables are then secured to the cable connector by crimping each end 6 and 7 of the connector. Crimping guides 28 and 30 are provided on the exterior 4 of the connector to demark the appropriate location of crimping. Strain relief grooves 24 and 26 are located on the exterior 4 of the cable connector adjacent the crimping guides 28 and 30, respectively, and provide relief from strain forces generated as the cable connector is crimped.

Two orifices 16 and 18 are provided in the ends 6 and 7 of the cable connector 2 to allow a cable damage repair chemical to be injected into the cable. Orifice 16 communicates with the hollow portion 12 of the cable connector, and orifice 18 communicates with the hollow portion 14. Each orifice 16 and 18 is preferably threaded to allow the orifice to be closed after chemicals have been pumped through the orifice, as described in further detail below. To facilitate even fluid flow through the interior 8 of the cable connector, interior circumferential grooves 20 and 22 are formed around the interior of the hollow portions 12 and 14, respectively. The interior grooves 20 and 22 preferably intersect orifice 16 and orifice 18, respectively, to channel chemicals pumped through the orifice around the exterior of each cable contained in the ends of the cable connector.

The exterior 4 of the cable connector 2 is also formed with circumferential seal grooves 32 and 34 adjacent the ends 6 and 7 of the connector, respectively. The seal grooves are sized to receive an O-ring or other seal known in the art, to optionally provide an enhanced seal between the cable connector 2 and electrical cable sections or cables, as described in further detail below.

Figure 3:
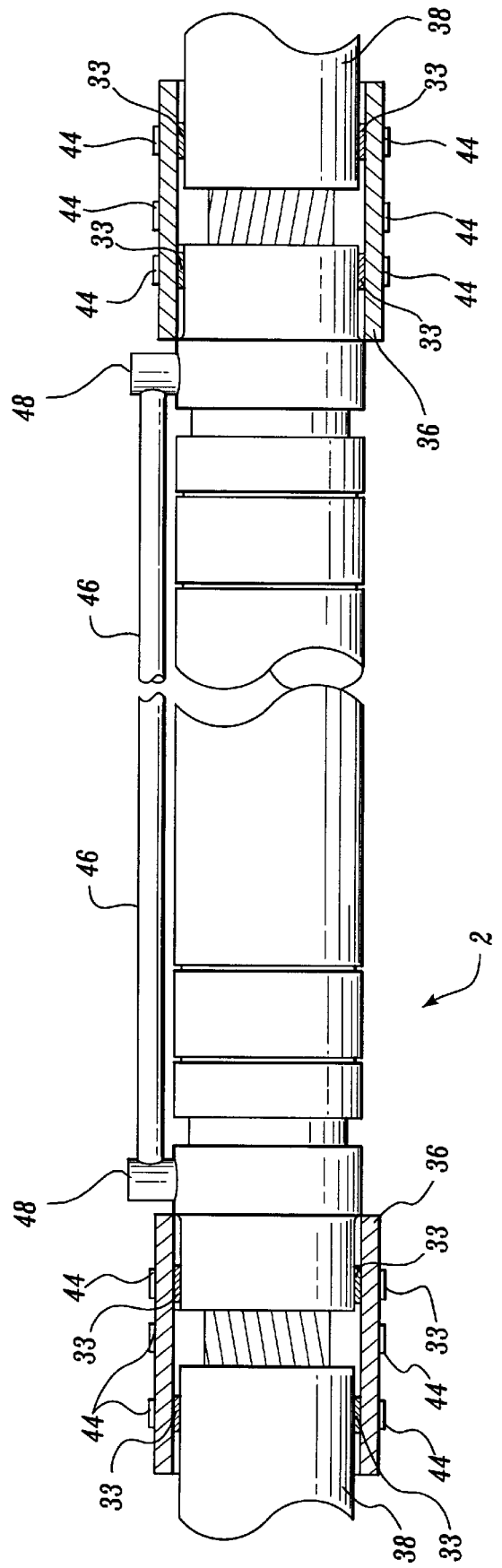
FIG. 3 is a side view of a first embodiment of the cable connector of the present invention secured to a cable for injection of cable damage repair chemicals therethrough and for electrical connection of the cable with a second cable.

FIG. 3 shows a first embodiment for attachment of the cable connector 2 to an electrical cable in which an O-ring or other seal is not employed in seal groove 32, and seal groove 32 is not present. Instead, broad band seals 33 can be employed between sheath 36 and connector 2 and cable 38. Alternatively, sheath 36, itself, may provide a tight enough seal without seals if sheath 36 is, for example, vinyl. Also, instead of broad band seals 33, an adhesive can be employed between sheath 36 and connector 2 and cable 38. As shown in FIG. 3, sheath 36 is initially placed over the end 6 of the cable connector 2. The sheath 36 is preferably comprised of a liquid tight material that can be either resilient or can have heat-shrink properties and can be, for example, rubber, vinyl, polyethylene, or nylon. Cable 38 that is comprised of, for example, cable insulation 40 and cable strands 42, is inserted into the end of the cable connector and secured in the hollow portion 12 by crimping the connector. Sheath connectors 44, which may be, for example, steel bands or clamps, or other material with high tensile strength, are placed around the sheath 36 to secure the sheath 36 at the juncture of the end 6 of cable connector 2 and the cable insulation 40 of the cable 38.

Once the cable 38 is secured to the cable connector 2, cable water-damage repair chemicals, such as, for example, a silicone fluid (CABLECURE®), may be injected into the cable 38. The repair chemicals are supplied from a pressure source known in the art through a tube 46 in communication with a tube fitting 48. Tube fitting 48 is preferably threadedly mateable with orifices 16 and 18, and preferably also functions as a closure device. As shown in FIG. 3, after passing through tube fitting 48, the silicone fluid flows through orifice 16, into hollow portion 12, where it contacts cable strands 42 of cable 38, passes out of end 6 of elongate conduit 2 and into cable 38 for a predetermined distance. After sufficient silicone fluid has been injected into the cable the tube 46 is removed. The tube fitting 48 remains in the orifices 16 and 18 and is plugged to the orifices 16 and 18.

After termination of cable water-damage repair chemical treatment and after the tube 46 is detached from the tube fitting 48, the electrical cable or cable sections are electrically energized. It will be appreciated that because the cable connector 2 is electrically conductive, cable 38 is electrically connectable to any other cable also attached to the cable connector. Note that while FIG. 3 only shows and describes the chemical repair and electrical connection of a single cable 38 to the cable connector 2 at end 6, it is understood that a second cable can be attached at end 7 of the cable connector 2 for a similar chemical repair and electrical connection. In other words, the present invention encompasses both a cable connector 2 having only an end 6 and not an end 7 to secure only a single cable 38 with some other known electrically conductive connection to other devices in place of end 7, as well as a cable connector 2 having both an end 6 and an end 7 to secure, repair and electrically connect two cables 38.

Figure 4:
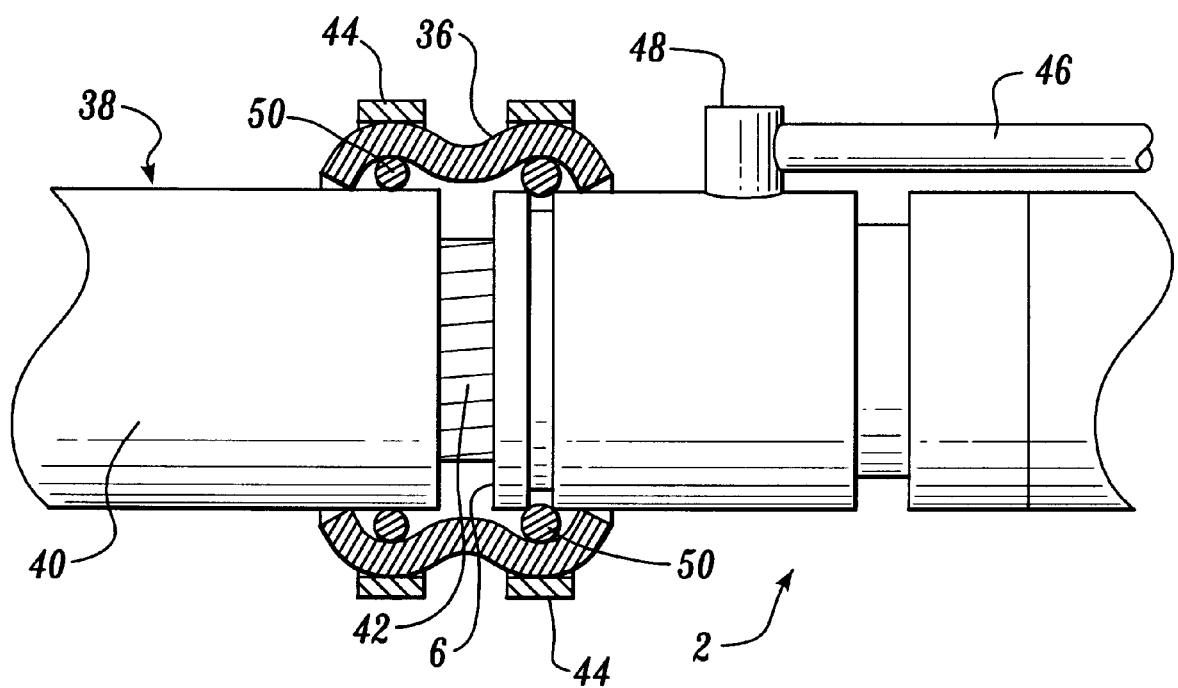
FIG. 4 is a side view of a second embodiment of the cable connector of the present invention secured to a cable for injection of cable damage repair chemicals therethrough and for electrical connection of the cable with a second cable.

Referring to FIG. 4, a second embodiment of the present invention is shown which is similar to the first embodiment of the present invention of FIG. 3 and in which the same element numbers are used as in FIG. 3 to describe like elements. The primary difference between the first embodiment of FIG. 3 and the second embodiment of FIG. 4 is that in the second embodiment of FIG. 4, an O-ring or seal 50 is located in the seal groove 32 adjacent the end 6 of the cable connector 2. The seal 50 is therefore located between the end 6 of the cable connector 2 and the sheath 36. A second seal 50 is also located between the sheath 36 and the cable insulation 40 of cable 38. Additionally, sheath 36 is bowed such that concave portions are present for the placement of seals 50 between sheath 36 and cable 38, and between sheath 36 and the end 6 of the cable connector 2, respectively. Additionally, sheath 36 is bowed such that a convex center portion provides additional closure at the juncture of attachment of cable 38 in end 6 of the cable connector 2.

Figure 6:
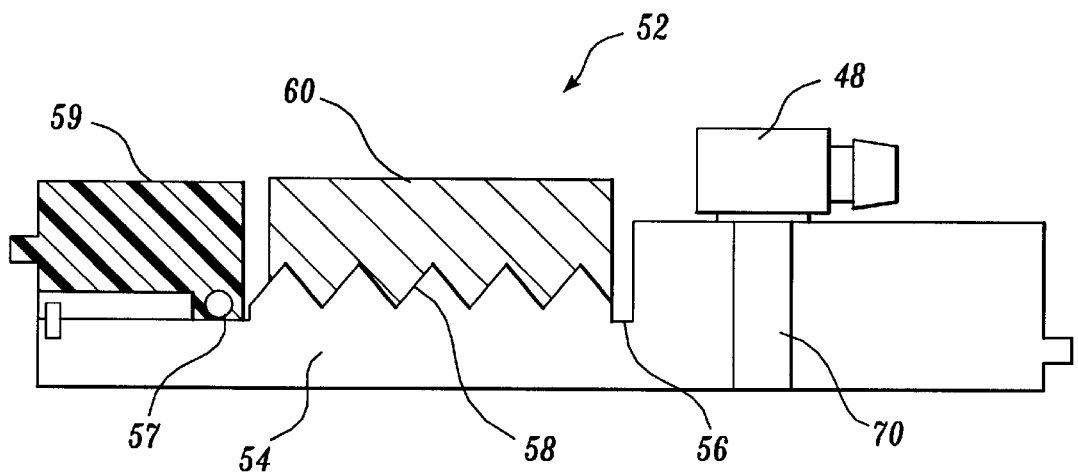
FIG. 6 is a detail view of FIG. 5.
Figure 5:
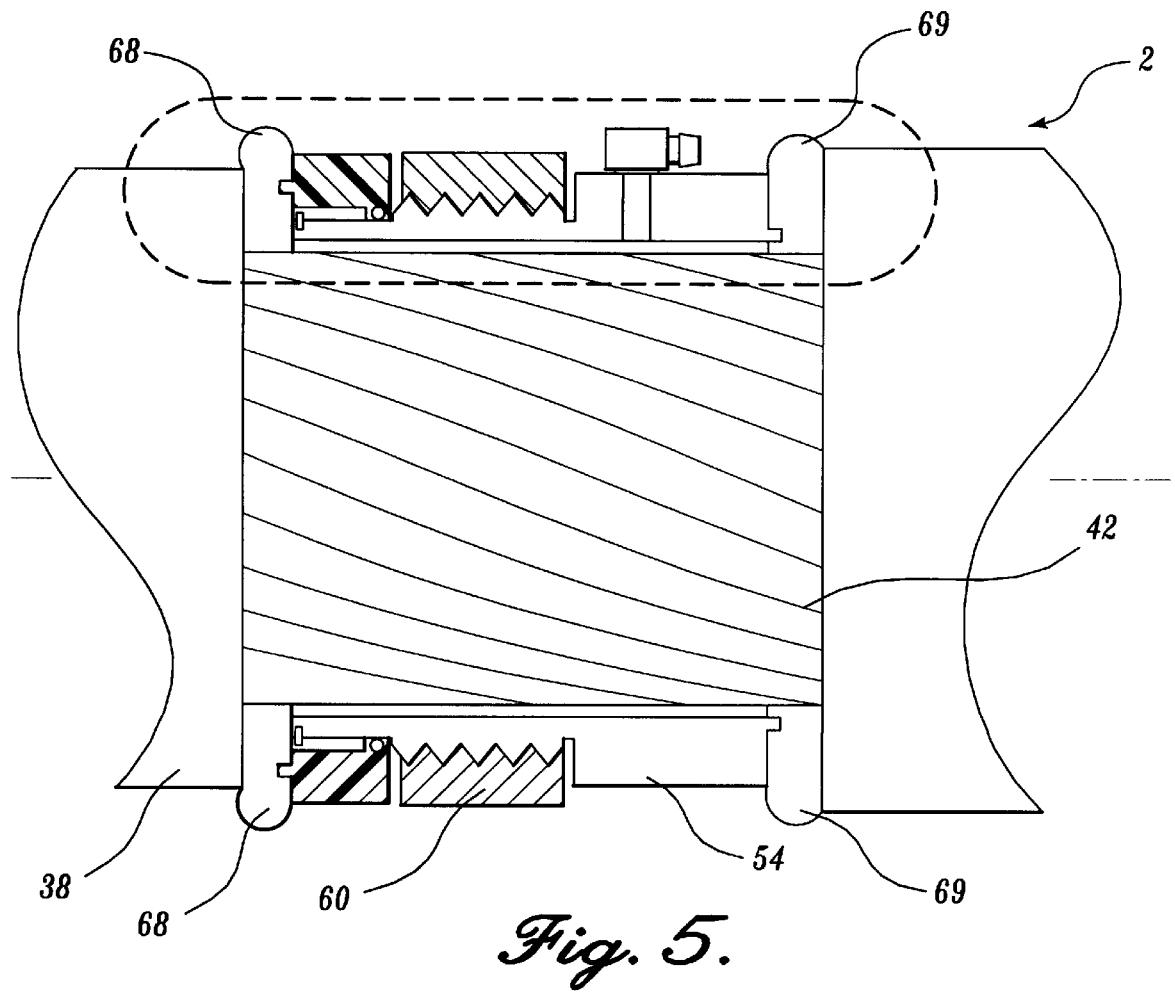
FIG. 5 is a side view, partially exposed, of a third embodiment of the cable connector of the present invention secured to a cable for injection of cable damage repair chemicals therethrough and for electrical connection of the cable with a second cable.

Referring to FIGS. 5 and 6, a third embodiment of the present invention is shown in which the same element numbers are used as are used in FIG. 3, which shows the first embodiment, to describe like elements. The primary difference between the first embodiment of FIG. 3 and the third embodiment of FIGS. 5 and 6 is that the third embodiment of FIGS. 5 and 6 does not employ a sheath 36 at the juncture of the end 6 of cable connector 2 and the insulation 40 of the cable 38. Instead, a threaded seal 52 is located at the juncture of end 6 of cable connector 2 and insulation 40 of cable 38. Threaded seal 52 is comprised of a preferably annular inner seal member 54 having an exterior surface 56. On exterior surface 56 are threads 58. Compression ring 59 is located on inner seal member 54 with O-ring seal 57 located therebetween. Threaded seal 52 also includes outer seal member 60 which is preferably annular, and which has threads 64 thereon that are mateable with threads 58 of inner seal member 54. Elastomeric packing 68 is located between the junctures of both compression ring 59 and inner seal member 54 with insulation 40 of cable 38, and elastomeric packing 69 is located between inner seal member 54 and end 6 of cable connector 2. Inner seal member 54 has a passageway 70 therethrough for passage of cable waterdamaged repair chemicals through threaded seal 52 and into contact with cable strands 42 of cable 38, in a manner described above for the first embodiment of the present invention. In operation, threaded interconnection of inner seal member 54 and outer seal member 60 imparts an axial force through compression ring 59 and into elastomeric packing 68 while inner seal member 54 imparts an opposite axial force on elastomeric packing 69 to form a complete seal. Note that in the third embodiment, connector 2 can be a connector known in the art, with the elements of the third embodiment being located over cable strands 42 and between insulation 40 and connector 2.

Figure 7:
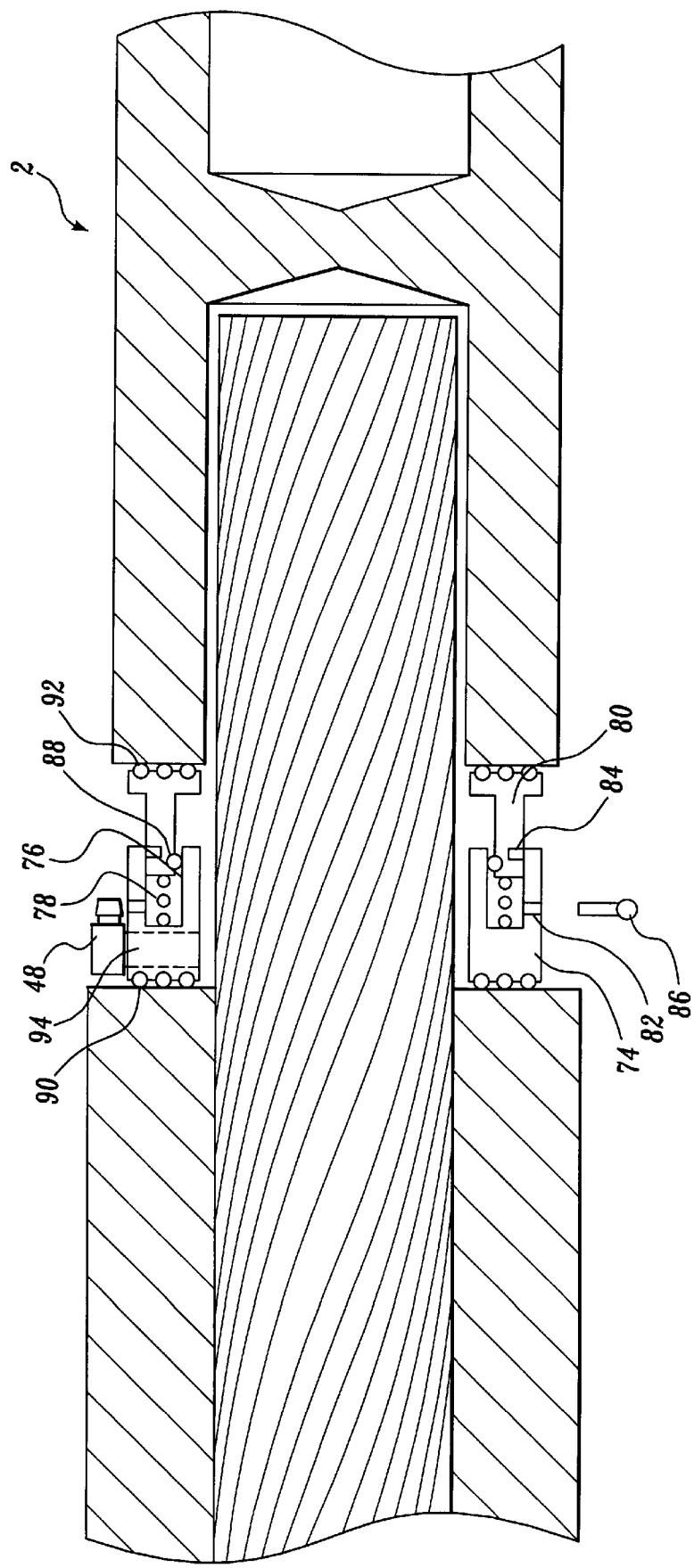
FIG. 7 is a side view, partially exposed, of a fourth embodiment of the cable connector of the present invention secured to a cable for injection of cable damage repair chemicals therethrough and for electrical connection of the cable with a second cable.

Now referring to FIG. 7, a fourth embodiment of the present invention is shown which includes elements described in the first embodiment of the present invention of FIG. 3, these elements having like element numbers to those in the first embodiment of FIG. 3. Unlike the first embodiment of the present invention of FIG. 3 in which sheath 36 is located at the juncture of the end 6 of cable connector 2 and insulation 40 of cable 38, in the fourth embodiment of the invention of FIG. 7, spring seal 72 is employed. Spring seal 72 is comprised of a spring receptacle portion 74 which is preferably annular in shape and which has a hollow interior 76 which is sized to receive spring 78. Spring seal 72 also includes annular elongate portion 80 which is mateable with hollow interior 76 of spring receptacle portion 74 to compress spring 78 when spring seal 72 is secured. Hole 82 passes through spring receptacle portion 74, communicates with hollow interior 76 thereof, and is coaxially aligned with hole 84 when elongate portion 80 is inserted into hollow interior 76 of spring receptacle portion 74. Pin 86 is adapted to pass through hole 82 of spring receptacle portion 74 and hole 84 of elongate portion 80 to lock elongate portion 80 in spring receptacle portion 74. O-ring-type seal 88 is present between elongate portion 80 and spring receptacle portion 74 in hollow interior 76 thereof; O-ring-type seal 90 is present between spring receptacle portion 74 and insulation 40 of cable 38, and O-ring-type seal 92 is present between elongate portion 80 and end 6 of cable connector 2 to provide a fluid-tight environment through which cable repair chemicals can pass. Passageway 94 is located through spring receptacle portion 74 to allow cable repair chemicals to pass through spring seal 72 and contact cable strands 42 of cable 38.

Figure 8:
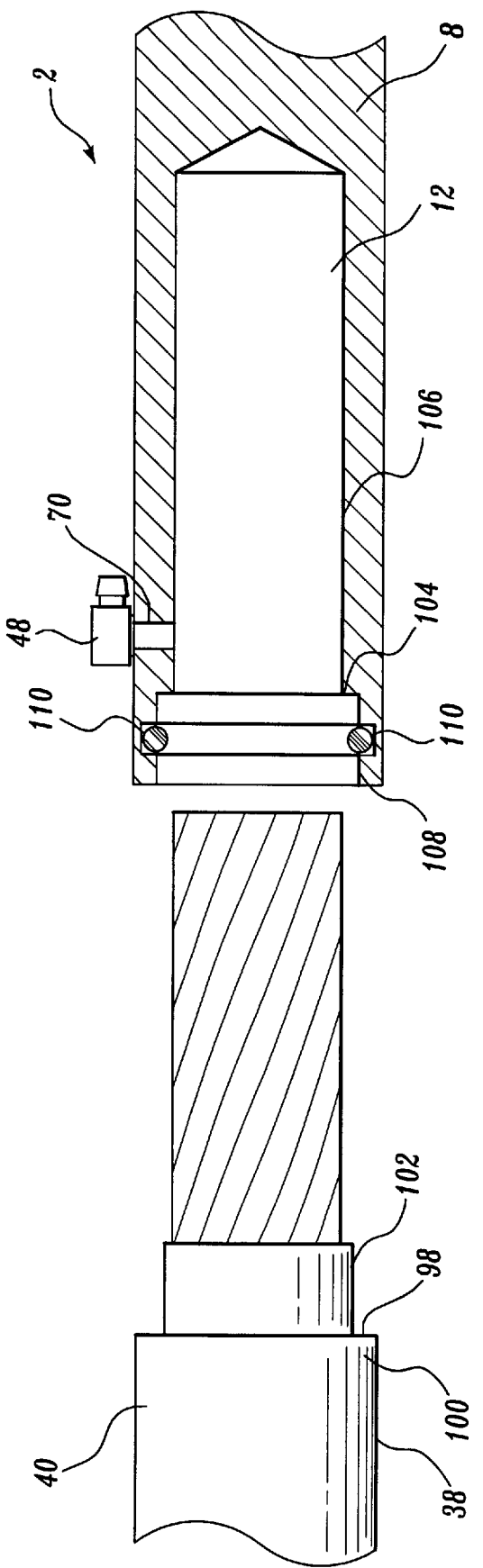
FIG. 8 is a side view of a fifth embodiment of the cable connector of the present invention secured to a cable for injection of cable damage repair chemicals therethrough and for electrical connection of the cable with a second cable.

Referring to FIG. 8, a fifth embodiment of the present invention is shown having elements that are also present in the first embodiment of the present invention of FIG. 3, these like elements having the same element numbers as those used in the first embodiment of FIG. 3. Unlike the first embodiment of the present invention of FIG. 3 in which sheath 36 is located at the juncture of the end 6 of cable connector 2 and insulation 40 of cable 38, in the fifth embodiment of FIG. 8, a fluid-tight connection between cable 38 and connector 2 is created by cable shoulder 98 which is defined by first portion 100 of insulation 40 having a standard outside diameter and by a second portion 102 of insulation 40 having an outside diameter less than the outside diameter of first portion 100 of insulation 40 of cable 38. A seat 104 in hollow portion 12 of interior 8 of connector 2 is mateable with shoulder 98. More specifically, seat 104 includes first portion 106 that has an inside diameter less than the outside diameter of second portion 102 of insulation 40, and also includes a second portion 108 that has an inside diameter greater than the outside diameter of second portion 102 of insulation 40. Thus, second portion 102 of insulation 40 is insertable into second portion 108 of hollow portion 12, but second portion 102 of insulation 40 has an outside diameter too great to clear the lesser inside diameter of first portion 106 of hollow portion 12 such that shoulder 98 of insulation 40 mates with seat 104 of hollow portion 12 and abuts against end 6 of connector 2. To further ensure a fluid-tight fit between cable 38 and connector 2, annular seal 110, for example, an O-ring or the like, can be located between second portion 108 of hollow portion 12 and second portion 102 of insulation 40.

Figure 9:
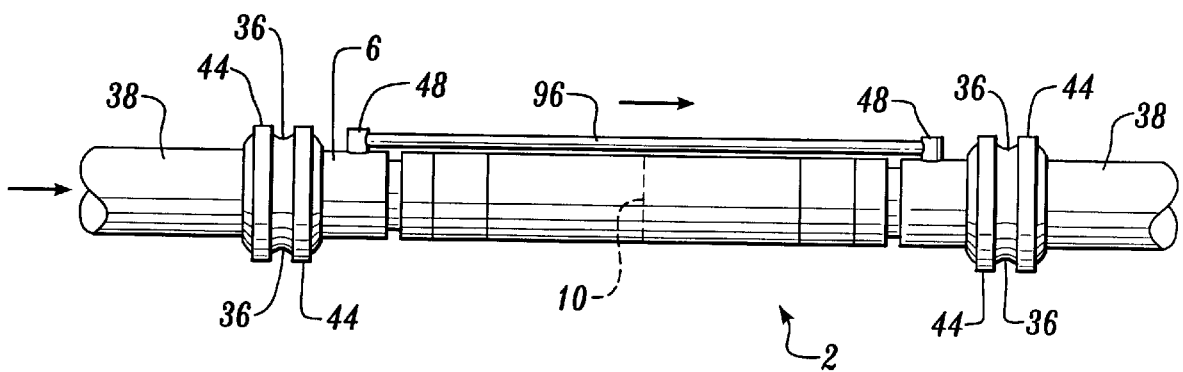
FIG. 9 is a side view of a sixth embodiment of the cable connector of the present invention secured to a cable for injection of cable damage repair chemicals therethrough and for electrical connection of the cable with a second cable.

Referring to FIG. 9, a sixth embodiment of the present invention is shown having elements that are also present in the first embodiment of the present invention of FIG. 3, these like elements having the same element numbers as those used in the first embodiment of FIG. 3. In the sixth embodiment of FIG. 9, a configuration is shown which allows cable connector 2 to pass cable repair chemicals therethrough such that these chemicals are originated only at one end of cable connector 2, i.e., end 6, and not at both ends 6 and 7 of cable connector 2, whereby cable repair chemicals flow in a single direction through cable connector 2. The above configuration is useful when cable connector 2 is located remotely from the initial injection point of the cable repair chemicals into cable 38. Thus, as shown in FIG. 9, tube 96 is employed to connect tube fitting 48 of end 6 with tube fitting 48 of end 7 such that cable repair chemicals entering end 6 of cable connector 2 are not blocked by interior wall 10, but instead pass through tube fitting 48 of end 6, through tube 96, through tube fitting 48 of end 7, and out of end 7 into the other portion of cable 38 which is joined by cable connector 2.

Those skilled in the art will recognize that the subject invention can be used in low, medium, or high voltage environments, and is also applicable for the use of air drying techniques for cable water contamination in addition to the above described water damage repair chemical application.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A device for repairing and electrically connecting at least two sections of electrical cable, each of the electrical cable sections having an end and an interior, the device comprising:

an elongate conduit having two open ends that are each adapted to receive an end of an electrical cable section, having an exterior, and having an interior wall longitudinally dividing the elongate conduit into two portions, each portion having a hollow interior integrally formed within said conduit for receiving said end of said electrical cable section, the elongate conduit having an orifice in each of the two portions communicating with the hollow interior of one of the two portions and a closure device for said orifices; the elongate conduit having a seal adjacent each of the two open ends such that water damage to electrical cable is repaired by securing said end of said electrical cable section in the hollow interior of each of the two portions of the elongate conduit to form a juncture, sealing the juncture of said electrical cable section end and said open end of the electrical conduit with the seals, and passing repair chemicals through the orifices in the elongate conduit, into the hollow interior of each of the two portions of the elongate conduit and into the interior of the sections of the electrical cable, the sections of electrical cable being electrically connectable without physically contacting each other when secured in the hollow interior of the two portions of the elongate conduit.

2. The device of claim 1 wherein the elongate conduit further comprises an annular groove adjacent each elongate conduit end and around the elongate conduit exterior for strain relief.

3. The device of claim 1 wherein at least one of the seals comprises a fluid-tight sheath over the juncture of each electrical cable section end and each end of the elongate conduit.

4. The device of claim 3 wherein the elongate conduit further comprises an annular groove adjacent each elongate conduit end and around the elongate conduit exterior that is sized to receive an internal seal locatable between the elongate conduit and the fluid-tight sheath.

5. The device of the claim 1 wherein the elongate conduit further comprises a tube connecting the two orifices such that the repair chemicals pass from one end of the elongate conduit, through one orifice, through the tube, through the other orifice, and into the other end of the elongate conduit.

6. The device of claim 1 wherein at least one of the seals comprises:
a first portion with a threaded surface; and
a second portion having a threaded surface mateable with the threaded surface of the first portion for screw connection thereof.

7. The device of claim 6 wherein one of the orifices of the elongate conduit is located in the first portion of the seal.

8. The device of claim 1 wherein at least one of the seals comprises:
a first portion having an exterior and a hollow interior;
a spring in the hollow interior of the first portion;
a second portion having an elongate member matable in the hollow interior of the first portion to compress the spring; and
a lock member that secures the elongate member of the second portion in the hollow interior of the first portion.

9. The device of claim 8 wherein the lock member is a pin insertable through a hole in the first portion that is coaxially mateable with a hole in the elongate member of the second portion.

10. The device of claim 8 wherein one of the orifices of the elongate conduit is located in the first portion of the seal.

11. The device of claim 1 wherein the electrical cable has an insulation cover, and at least one of the seals comprises:
a shoulder defined by a first portion of the insulation cover of the electrical cable having an outside diameter and by a second portion of the insulation cover of the electrical cable having an outside diameter less than the outside diameter of the first portion of the insulation cover; and
a seat in at least one of the hollow interiors of the elongate conduit, the seat dividing the hollow interior into a first portion having an inside diameter less than the outside diameter of the second portion of the insulation cover of the electrical cable and a second portion having an inside diameter greater than the outside diameter of the second portion of the insulation cover of the electrical cable.

12. A device for repairing and electrically connecting a section of electrical cable having an end and an interior, the device comprising:

an elongate conduit having an open end that is adapted to receive an end of an electrical cable section, having an exterior, and having a hollow interior integrally formed within said conduit for receiving said end of said electrical cable section, the elongate conduit having an orifice communicating with the hollow interior and a closure device for the orifice, the elongate conduit having a seal adjacent the open end of the elongate circuit such that water damage to electrical cable is repaired by securing said end of said electrical cable section in the hollow interior of the elongate conduit to form a juncture, sealing the juncture of the electrical cable section end and the elongate conduit open end with a seal, and passing repair chemicals through the orifice in the elongate conduit, into the hollow interior of the elongate conduit and into the interior of the electrical cable, the section of electrical cable being electrically connectable to an electrically conductive assembly without physically contacting the assembly when secured in the hollow interior of the elongate conduit.

13. The device of claim 12 wherein the seal comprises a fluid-tight sheath over the juncture of the electrical cable section end and the end of the elongate conduit.

14. A device for repairing and electrically connecting at least two sections of electrical cable, each of the electrical cable sections having an end and an interior, the device comprising:

an elongate conduit having two open ends that are each adapted to receive an end of an electrical cable section, having an exterior, and having an interior wall longitudinally dividing the elongate conduit into two portions, each portion having a hollow interior for containing an end of an electrical cable section, the elongate conduit having an orifice in each of the two portions communicating with the hollow interior of one of the two portions and a closure device for each orifice; the elongate conduit having a seal adjacent each of the two open ends such that water damage to electrical cable is repaired by securing an end of an electrical cable section in the hollow interior of each of the two portions of the elongate conduit to form a juncture, sealing the juncture of each electrical cable section end and each open end of the electrical conduit with the seals, and passing repair chemicals through the orifices in the elongate conduit, into the hollow interior of each of the two portions of the elongate conduit and into the interior of the sections of electrical cable, the sections of electrical cable being electrically connectable when secured in the hollow interior of the two portions of the elongate conduit, wherein at least one of the seals comprises a fluid-tight sheath over the juncture of each electrical cable section end and each end of the elongate conduit, wherein the elongate conduit further comprises an annular groove adjacent each elongate conduit end and around the elongate conduit exterior that is sized to receive an internal seal locatable between the elongate conduit and the fluid-tight sheath.

* * * * *